(12) United States Patent
Webb

(10) Patent No.: US 9,239,468 B2
(45) Date of Patent: Jan. 19, 2016

(54) IMAGING DEVICE

(75) Inventor: Duncan Webb, Essex (GB)

(73) Assignee: SELEX ES LTD, Essex (GB)

( * ) Notice: Subject to any disclaimer, the term of this patent is extended or adjusted under 35 U.S.C. 154(b) by 129 days.

(21) Appl. No.: 13/503,518

(22) PCT Filed: Oct. 12, 2010

(86) PCT No.: PCT/EP2010/065278
§ 371 (c)(1),
(2), (4) Date: Jul. 5, 2012

(87) PCT Pub. No.: WO2011/047990
PCT Pub. Date: Apr. 28, 2011

(65) Prior Publication Data
US 2012/0268614 A1 Oct. 25, 2012

(30) Foreign Application Priority Data
Oct. 21, 2009 (GB) .................................. 0918453.2

(51) Int. Cl.
*H04N 5/225* (2006.01)
*G02B 7/02* (2006.01)
*G02B 27/64* (2006.01)
*G03B 5/00* (2006.01)
*H04N 5/232* (2006.01)

(52) U.S. Cl.
CPC ................ *G02B 27/646* (2013.01); *G03B 5/00* (2013.01); *H04N 5/23248* (2013.01); *H04N 5/23287* (2013.01); *G02B 7/023* (2013.01); *G03B 2205/0007* (2013.01); *G03B 2205/0069* (2013.01)

(58) Field of Classification Search
CPC .................................................... G11B 7/0932
USPC .......................................... 348/357; 382/236
See application file for complete search history.

(56) References Cited

U.S. PATENT DOCUMENTS

| 5,619,735 A | 4/1997 | Kai |
| 6,556,364 B2 * | 4/2003 | Meehan et al. ............... 359/822 |
| 6,930,842 B2 | 8/2005 | Shibazaki |
| 2001/0038500 A1 | 11/2001 | Shibazaki |
| 2002/0176713 A1 * | 11/2002 | Kai et al. ...................... 396/429 |

(Continued)

FOREIGN PATENT DOCUMENTS

| EP | 1139175 A2 | 10/2001 |
| EP | 1 832 912 A3 | 10/2007 |

(Continued)

OTHER PUBLICATIONS

Search Report dated Jan. 27, 2010, issued in corresponding United Kingdom Patent Application No. 0198453.2. (3 pages).

(Continued)

*Primary Examiner* — Joel Fosselman
(74) *Attorney, Agent, or Firm* — Buchanan Ingersoll & Rooney PC

(57) ABSTRACT

An imaging device is described having an electro-mechanical image stabilization system capable of removing the effect on a generated image of vibration and angular movement of the device. The system includes a mechanical coupling interposed between the optics and the drive electronics of the device. The coupling ensures that movement generated by vibration is translated into linear movement of the optics and the drive electronics relative to each other.

12 Claims, 3 Drawing Sheets

(56) References Cited

U.S. PATENT DOCUMENTS

| | | |
|---|---|---|
| 2005/0276588 A1 | 12/2005 | Tsutsumi |
| 2009/0102403 A1* | 4/2009 | Lule .............................. 318/135 |
| 2009/0279799 A1* | 11/2009 | Suzuki et al. ................. 382/236 |

FOREIGN PATENT DOCUMENTS

| | | |
|---|---|---|
| GB | 2 420 873 A | 6/2006 |
| WO | 2008/099642 A1 | 8/2008 |

OTHER PUBLICATIONS

International Search Report (PCT/ISA/210) issued on Jan. 11, 2011, by European Patent Office as the International Searching Authority for International Application No. PCT/EP2010/065278.

Written Opinion (PCT/ISA/237) issued on Jan. 11, 2011, by European Patent Office as the International Searching Authority for International Application No. PCT/EP2010/065278.

* cited by examiner

FIGURE 1
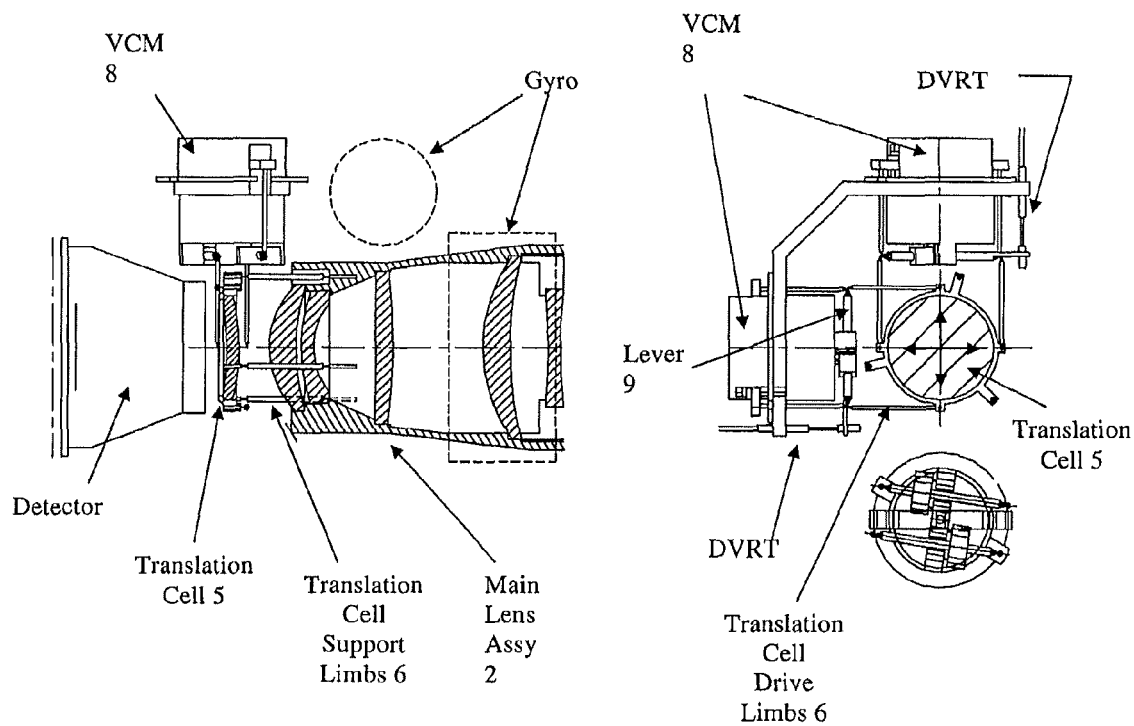
FIGURE 2

IMAGING DEVICE

The invention relates to imaging devices. More specifically, but not exclusively it relates to imaging devices including an image-stabilisation module that can either be implemented as an optical relay, or fully integrated into a lens design.

Known imaging devices including some form of image stabilization module can be found in many commercially available cameras and camcorders. Such devices use gyros to determine camera body angular motion in inertial space, and opto-mechanical mechanisms that move one or more lens elements within an optical path to compensate for image displacement at the focal plane array (FPA).

When an imaging system is stationary, each pixel on the FPA receives photon flux from a dedicated area within a scene. The charge accumulated at each pixel during a stare time is proportionate to the photon flux received. Diffraction through the optics of the imaging system will result in a small percentage of photon sharing at the pixel boundaries (known as the Airy disc effect). However when angular motion in the imaging system is introduced, the pixels are exposed to features substantially beyond their intended area of coverage. The flux from neighbouring features in the scene is averaged over time across multiple pixels, reducing the Modulation Transfer Function (MTF). From an observer's perspective it becomes increasingly difficult to resolve fine details within the scene and to detect, recognise & identify small, low-contrast targets.

Angular sightline jitter is a major contributor to system MTF loss for focal plane array (FPA) imaging devices. As focal length increases, overall angle of view and therefore angular-subtense per pixel decreases in object space. Generally, once sightline motion exceeds approximately 25% of the pixel pitch during the detector stare time, it can cause a reduction in MTF that potentially affects overall system performance, reducing the ability to distinguish low contrast features.

Linear sightline jitter has less impact on devices imaging at long ranges. Each pixel within the FPA subtends an angle into object space, so as the distance to target increases; the area represented by each pixel at the target also increases. For example, if an imager uses a 640×512 FPA detector and has a 1° HFoV; each pixel will cover ~27 mm at 1 Km and ~270 mm at 10 Km. Even with a linear disturbance of 5 mm peak to peak, the relative motion of the image compared to a pixel's dimensions would be less than 20% at 1 Km and less than 2% at 10 Km.

It should be noted that opto-mechanical image-stabilization and electronic-stabilization are fundamentally different. Opto-mechanical image-stabilization removes sightline jitter before the photon flux arrives at the detector. If a stable image is maintained at the FPA throughout the detector stare time, the charge accumulated at each pixel corresponds accurately to the intended area of coverage within the scene. There is no corruption of signal due to unrelated features moving through a pixel's field of view. Electronic image-stabilization occurs after the photon flux has been detected. It is a post processing function that provides a visual enhancement to an observer by correcting the registration of sequentially displaced TV frames at the display. Electronic-stabilization can compensate for low-frequency scene motion from displayed TV frame to displayed TV frame, however although the presented image may appear stable, the MTF of the raw frame data is likely to be poor.

Commercial image stabilized camera/lenses are generally intended for handheld use. Although effective at removing low frequency, low acceleration, angular jitter; limitations in the lens construction, configuration and servo bandwidth makes them unsuitable for the harsh dynamic environments associated with more demanding situations.

Typically, though not exclusively, stabilizing elements within commercial lenses translate across the optical axis to compensate for angular body motion of the camera. The stabilizing element may be mounted on a 2-axis translation stage with each axis driven by a linear actuator, usually in the form of a bespoke voice coil motor (VCM). Significantly, the stabilizing element and armature move in the same direction. For a standard camera system whose lens is focused at infinity, containing no image-stabilization mechanism, linear disturbance is generally undetectable on the image. As described previously, this is because the angular subtense in object space of a single FPA pixel represents a large area at the target; and the area increases with range. Displacements associated with linear vibration are small in comparison.

In the case of commercially available stabilized lenses, if linear acceleration is applied to the camera/lens body across the optical axis; the disturbing force is transmitted to the stabilizing element by friction within the translation stage slides, and magnetic coupling across the VCM. Opposing the disturbing force is the combined inertia of the stabilizing element and VCM armature, which tends to hold them still in space. If the inertial force exceeds the coupling force from the VCM, the FPA and fixed elements of the lens assembly move with respect to the stabilizing element causing the image to become displaced at the FPA. This gives the appearance of angular jitter and therefore affects imaging performance.

Commercial image stabilized lenses are generally low bandwidth, not very robust, and susceptible to performance degradation when subjected to linear accelerations across the line of sight. The lens cell slides up and down rails and these sliding interfaces require mechanical clearances that make the assembly prone to wear; particularly if subjected to more harsh environments.

According to the invention there is provided an imaging device for capturing an image of a scene comprising a stabilizing module, said module including a lens element, a coupling device and drive means, the coupling device being interposed between the lens element and the drive means acting so as to move the lens element in a linear direction opposite to that of the motor means when the system is subjected to angular movement.

The proposed image-stabilised (IS) lens has the capacity to translate the final image across the FPA by approximately +/−2.5% of the FoV (i.e. +/−16 pixels), with full scale deflection anticipated up to 150 Hz or greater, rolling off to +/−0.5 pixels at ~850 Hz. It is preferably achieved by translating a single lightweight lens element across the optical axis using a closed-loop servo. Inertial sensors mounted to the lens body determine body motion, and position sensors measure the relationship between the translation cell and lens body to derive sightline direction. The ability to manage a dynamic environment is focal length dependent; with wide FoV systems being inherently more tolerant to body motion than narrow FoV systems due to the increased pixel subtense.

The inclusion of such a drive-system geometry, that eliminates sensitivity to linear disturbance; allows the image stabilizing mechanism to operate at a higher bandwidth and in doing so, supports a range of performance enhancing system functions. This, therefore, addresses the limitations of commercial lenses and their susceptibility to damage and performance degradation when operating in harsh vibration environments.

The invention will now be described with reference to the accompanying diagrammatic drawings in which:

FIG. 1 is a schematic drawing of an imaging device in accordance with one form of the invention showing a lens element mounted in a bezel to form a translational cell, the cell being supported by a series of limbs in a main lens assembly;

FIG. 2 is a schematic drawing showing the support limbs for supporting the lens element within the imaging device of FIG. 1;

Figure 3:
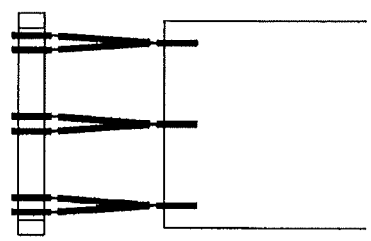
FIG. 3 is a schematic drawing showing the movement of the limbs of FIG. 2.

FIG. 1 shows one form of the image stabilized (IS) device 1. The IS device works by translating a single lightweight lens element 2 in the X & Y direction across the optical axis 3. The lens element 2 is bonded into a lightweight aluminium bezel 4 (or other suitable lightweight material), to form a translation cell 5.

Lens assemblies and/or relay assemblies are typically compound devices comprising a lens body and a number of lens elements that together make up the optical prescription. The IS lens element 2 is one of the elements in that overall assembly. In the embodiment of the invention described here, the stabilising element is the last element in the optical chain; i.e. the one closest to the FPA, as this is generally the smallest and lightest. However, it will be appreciated that any of the lens elements in the lens assembly may be stabilized in the manner described below.

The cell 5 is suspended from the body of the main lens assembly on three flexible support limbs 6 capable of deforming into an 'S'-shape as shown in FIGS. 2 and 3. FIG. 2's upper view shows a typical straight limb construction, whilst the lower view shows the limb 6 deflected into two positions (up & down). FIG. 3 shows the lens body envelope to the right and the translation cell 5 mounted off it to the left, and displaced into two positions. As can be seen from these Figures, the displacement is a parallelogram and the orthogonality of the lens cell 5 is maintained with respect to the optical axis.

The limbs 6 are fabricated from stainless steel spring wire, stiffened locally with layers of stainless steel tubing 7, welded or bonded together with a high strength adhesive. It will be appreciated that the limbs 6 and the tubing 7 may be fabricated from any other suitable materials having the required materials properties. The tubing 7 creates rigid elements on either side of the wire flexures and results in a lightweight assembly with very high axial stiffness to retain focus, but low bending stiffness allowing the cell 5 to translate freely. The support limb configuration deforms as a parallelogram and maintains the translation cell's orthogonality to the optical axis when laterally displaced.

X & Y drive is provided by two orthogonally mounted voice coil motors 8 (VCMs) coupled to the translation cell 5 by drive couplings through a lever system 9. The VCMs 8 provide independent drive in the X & Y directions, the combination of which allows the lens cell to translate anywhere in the X-Y plane.

The construction and characteristics of the drive couplings is similar to the support limbs; i.e. having high axial stiffness and low bending stiffness. This provides a rigid coupling in the required drive directions, but compliance in the lateral directions enabling each VCM 8 to drive the translation cell 5 without influencing the other.

The IS lens concept is required to be compatible with a broad range of operating environments. Typical vibration environments impose six degrees-of-freedom, i.e. the vibration spectra contains linear components (displacements in X, Y & Z), and angular components (rotations around X, Y & Z).

As previously stated, the IS lens is designed to sense and correct angular sightline errors only, and this is achieved by making linear displacements of the translation cell 5.

If the cell 5 were to be coupled directly to the VCM 8 armature so that both cell 5 and armature moved together in the same direction; linear acceleration due to body motion would interact with their combined masses and generate a reaction force equal to the mass x acceleration. The VCM 8 would not only have to overcome the reaction force, but also apply additional force to compensate for angular sightline motion, making the drive components large and power hungry.

Figure 4:
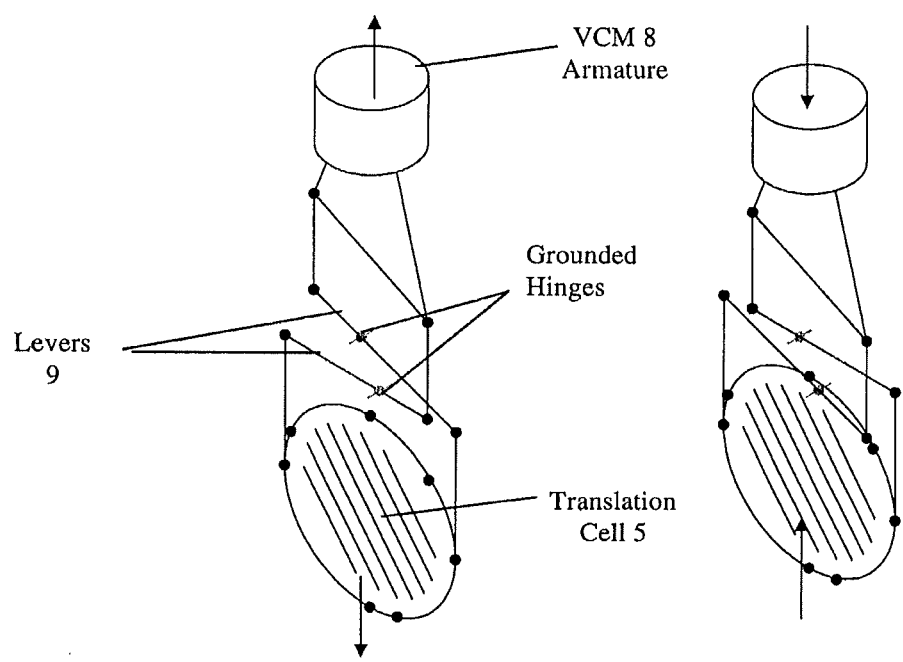
FIG. 4 is a schematic drawing showing a voice coil motor (VCM) coupled via a coupling mechanism to the cell of FIG. 1.
Figure 5:
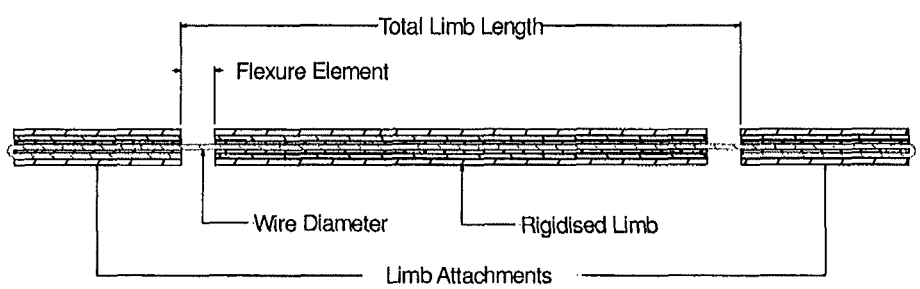
FIG. 5 is a schematic drawing showing an exploded view of one of the limbs of FIG. 2.

The lever system 9 creates a condition where the translation cell 5 and VCM 8 armature move in opposite directions (see FIG. 4). The position of the lever hinge-point is calculated so that the moments of the cell 5 and armature achieve a balanced condition. Under linear acceleration the reaction forces cancel, and all the force generated by the VCM 8 is made available to compensate for angular sightline errors.

It should be noted that the general construction of the support and drive limbs 6 may be common although lengths and specific dimensions may change; for example they all use a spring wire core locally rigidised with tubing. Where the wire has no rigidiser it acts as a flexure. This construction provides high stiffness in the axial directions where it is important; i.e. backlash-free in compression and tension, but low stiffness in bending.

The flexure limb 6 design has various features the design engineer can alter to optimise the stiffness characteristics of the system. They include the wire diameter, the diameter of the rigidised limbs (number of layers of tubing 7), the wire's mechanical properties, the flexure element length and the total limb length.

It will be appreciated that the invention may be implemented in medium wave infra red (MWIR) and long wave Infra red (LWIR) systems but that the construction techniques can equally be applied to uncooled IR and visual imaging.

Furthermore, it will be appreciated that the embodiment described above uses flexures that contain no clearances and are naturally better suited to environments having a large amount of vibration present. Moreover, it will be appreciated that the flexure construction uses materials that have consistent dimensional and mechanical properties, but that these materials need not be limited to those disclosed above and that any suitable materials may be used.

In the embodiment described above, it will be noted that the lever system described creates a condition of inertial balance and eliminates performance problems associated with linear vibration. It will be appreciated that any mechanism capable of providing such a condition may be substituted for the exact lever system described.

It will be appreciated that the Image-stabiliser can be used as a primary means of image-stabilisation where the camera body motion is <+/−2.5% of its FoV. However the mechanism described could just as easily be applicable to larger percentages if a suitable combination of optical and system parameters permits.

It will be appreciated that high-frequency vibration can be attenuated by the use of anti-vibration mounts at appropriate points in the imaging device.

Furthermore, it will be appreciated that the image-stabiliser hereinbefore described can be used as a sub-stabiliser within low or high-performance stabilised-platforms. Moreover, the lens gyros described above may be used to control both the lens and platform thus off-setting a significant component cost. It is anticipated this sub-stabiliser approach will support high-performance imaging from a low-performance platform to reduce cost, real estate and mass and other system properties.

In addition, the lens gyros may be used to control other stabilised sensors within a payload.

From the description above, it will be appreciated that the image-stabilizer is compatible with straight or folded optics and may be used in conjunction with Risley prisms to produce an in-line camera/lens with steering and stabilization. Furthermore, the image stabilizer described above may be used to correct small bore sight errors.

The image-stabilizer may also be used to support the gathering of polarimetric image data using non-homogeneous FPAs.

Furthermore, the image stabilizer can be used to selectively dither the image to collect real data and eliminate the need for interpolation to compensate for dead pixels within the FPA.

The combination of the construction method and use of high quality components such as fibre-optic gyros and DVRT position sensors allow the operating bandwidth of the system to be extended whilst providing a highly accurate sightline control. This makes the system potentially compatible with various system enhancing functions including but not limited to microscan and scene based referencing. Microscan requires image displacements in controlled half-pixel steps up to 4 times per TV frame and scene-based referencing requires image displacements in controlled whole pixel steps from TV frame to TV frame.

It is anticipated that combining electronic stabilisation and image registration algorithms with a digitally controlled, opto-mechanical IS lens could provide real benefits to a system. Functionality such as microscan and scene-based referencing could be made available from the same device with the three functions operating either independently or simultaneously. Microscan can provide significant improvements in resolution when viewing static scenes however if the camera is panned (even slowly), the combination of motion and temporal separation of the microscan subfield samples causes the information contained at each pixel to be displayed out of context when the image is reconstructed at the display. The only way to eliminate the problem is to ensure the image remains stationary whilst sampling of all sub-field positions that make up a TV frame. An IS lens approach potentially overcomes the problem.

In a further embodiment of the invention, modification of the microscan scan pattern from a two-by-two square to a figure-of-eight and re-registration of the displaced TV frames electronically enables image-stabilization, microscan and scene-based referencing functions to operate independently or simultaneously.

The invention claimed is:

1. An imaging device for capturing an image of a scene comprising:
   a stabilizing module including a lens element;
   flexible support limbs that support the lens element and extend along an optical axis of the lens element;
   flexible drive limbs that support the lens element and extend in an orthogonal direction to the optical axis of the lens element; and
   drive means for generating angular movement in the lens element; and
   a coupling device interposed between the lens element and the drive means for moving the lens element in a linear direction opposite to that of the drive means when the lens device is subjected to the angular movement, the coupling device translating movement from the driving means to the lens element via the flexible drive limbs, wherein the coupling device includes the flexible drive for coupling the lens element and the drive means.

2. An imaging device according to claim 1, wherein the flexible drive limbs are arranged in a system of levers such that said levers create a condition of inertial balance to eliminate an effect of linear vibration.

3. An imaging device according to claim 1 in which a position of a lever hinge-point is calculated such that moments of the lens element and the drive means achieve a balanced condition such that under linear acceleration reaction forces cancel, and all force generated by the drive means is made available to compensate for angular sightline errors in the imaging device.

4. An imaging device according to claim 1 in which the lens element is one of a plurality of lens elements in the imaging device forming a lens assembly, said lens element being suspended from a body of the lens assembly on a series of the flexible support limbs which will deform into an 'S'-shape during operation.

5. An imaging device according to claim 4 in which the flexible support limb configuration deforms as a parallelogram thereby maintaining orthogonality of the lens element to an optical axis when laterally displaced.

6. An imaging device according to claim 4 in which the flexible support limbs and flexible drive limbs comprise:
   spring wire, stiffened locally with layers of tubing, welded or bonded together with a high strength adhesive.

7. An imaging device according to claim 6 in which the spring wire and the tubing are formed from stainless steel.

8. An imaging device according to claim 2 in which the levers are formed from stainless steel suitable joined or hinged together.

9. An imaging device according to claim 1 in which the drive means comprises:
   two orthogonally mounted voice coil motors, the motors providing independent drive in X and Y directions, a combination of which allows the lens element to translate anywhere in an X-Y plane.

10. An image stabilizing device according to claim 1, in combination with a camera.

11. An image stabilizing device 2, wherein the system of levers is separated into two sets of series connected levers, a first set of levers being connected in series between the drive means and a point on an edge of the lens element, and a second set of levers being connected in series between the drive means and a point on an opposite edge of the lens element.

12. An imaging device for capturing an image of a scene comprising:
   a stabilizing module including a lens element, a coupling device, flexible support limbs, and drive means, the coupling device being interposed between the lens element and the drive means for moving the lens element in a linear direction opposite to that of the drive means when the device is subjected to angular movement, the coupling device translating movement from the driving means to the lens element via the flexible support limbs, wherein the coupling device includes a plurality of levers connected in series and coupling the lens element and the drive means, and wherein the plurality of levers is separated into two sets of series connected levers, a first set of levers being connected in series between the drive means and a point on an edge of the lens element, and a second set of levers being connected in series between the drive means and a point on an opposite edge of the lens element.

* * * * *